(12) United States Patent
Namiki

(10) Patent No.: US 7,948,472 B2
(45) Date of Patent: May 24, 2011

(54) PERSONAL COMPUTER MOUSE

(76) Inventor: Tosiki Namiki, Saku (JP)

( * ) Notice: Subject to any disclaimer, the term of this patent is extended or adjusted under 35 U.S.C. 154(b) by 629 days.

(21) Appl. No.: 11/546,756

(22) Filed: Oct. 12, 2006

(65) Prior Publication Data

US 2007/0277119 A1    Nov. 29, 2007

(30) Foreign Application Priority Data

May 24, 2006    (JP) .................. 2006-003946

(51) Int. Cl.
*G06F 3/033* (2006.01)

(52) U.S. Cl. .......... 345/163; 345/157; 248/118; 341/21; D14/402

(58) Field of Classification Search .......... 345/156–163, 345/167, 168; 248/118, 118.1, 118.5; 341/21–23; D14/402, 405–410

See application file for complete search history.

(56) References Cited

U.S. PATENT DOCUMENTS

| | | | |
|---|---|---|---|
| 4,582,498 A | 4/1986 | Tamada | |
| 4,928,412 A | 5/1990 | Nishiyama | |
| 5,156,283 A | 10/1992 | Sampson | |
| 5,256,457 A | 10/1993 | Pantaleo et al. | |
| 5,269,717 A | 12/1993 | Tardif | |
| 5,355,147 A * | 10/1994 | Lear ............................ | 345/156 |
| 5,553,735 A | 9/1996 | Kimura | |
| 5,570,112 A | 10/1996 | Robinson | |
| D381,015 S | 7/1997 | Morrison et al. | |
| 5,851,623 A | 12/1998 | Tarulli et al. | |
| 5,948,520 A | 9/1999 | Hirsch | |
| 6,016,138 A | 1/2000 | Harskamp et al. | |
| D420,339 S | 2/2000 | Burke | |
| 6,040,539 A | 3/2000 | Hiegel | |
| 6,066,021 A | 5/2000 | Lee | |
| 6,099,929 A | 8/2000 | Chinen | |
| 6,099,934 A | 8/2000 | Held | |
| 6,106,909 A | 8/2000 | Hirsch | |
| 6,117,502 A | 9/2000 | Liao | |
| 6,138,870 A | 10/2000 | Lin | |
| 6,155,411 A | 12/2000 | Ho | |
| 6,160,540 A | 12/2000 | Fishkin et al. | |
| 6,195,085 B1 | 2/2001 | Becker et al. | |
| 6,380,926 B1 | 4/2002 | Ho | |
| 6,525,713 B1 * | 2/2003 | Soeta et al. .................. | 345/160 |
| 7,046,230 B2 * | 5/2006 | Zadesky et al. ............. | 345/156 |
| 7,132,785 B2 * | 11/2006 | Ducharme .................... | 313/501 |
| 7,345,671 B2 * | 3/2008 | Robbin et al. ................ | 345/156 |
| 2005/0156890 A1 * | 7/2005 | Wierzoch ...................... | 345/163 |
| 2007/0262961 A1 * | 11/2007 | Chen ............................ | 345/173 |

FOREIGN PATENT DOCUMENTS

EP    0899650    3/1999

* cited by examiner

*Primary Examiner* — Kimnhung Nguyen
(74) *Attorney, Agent, or Firm* — Bacon & Thomas, PLLC

(57) ABSTRACT

A scroll function is performed by a horizontally rotating disk-shaped or ring-shaped scroll plate. when the peripheral portion is pressed down, the scroll plate is inclined such that the pressure portion becomes the lowest level and it is possible to assign a fixed function at a position to be pressed down. A left click button is provided in the middle of the scroll plate.

5 Claims, 6 Drawing Sheets

F I G. 7
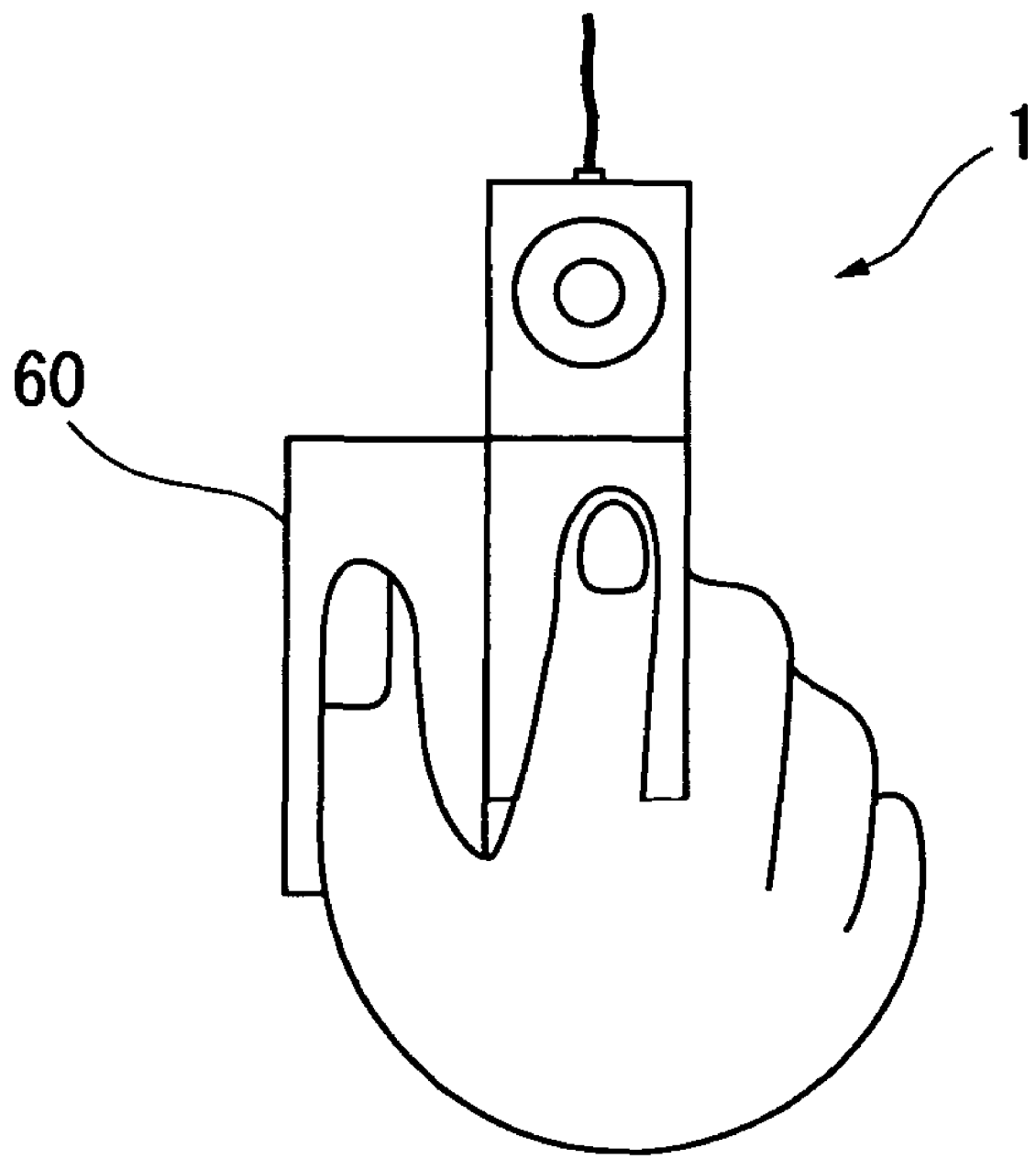

(a)

(b)

PERSONAL COMPUTER MOUSE

BACKGROUND OF THE INVENTION

1. Field of the Invention

The present invention relates to a personal computer mouse and more particularly to a personal computer mouse which is compact and easy to carry and which can be simply and quickly operated.

2. Description of the Related Art

A personal computer mouse is provided with a pointer function in which a mouse pointer shown on the screen of a personal computer is moved, a left click function in which instructions are given from a left button, a right click function in which instructions are given from a right button, and a scroll function in which instructions are given from the central wheel, etc.

In the pointer function, the mouse pointer on the screen is instructed to move in the same way as the movement of a mouse on a flat surface. Then, in accordance with a method for detecting the movement of a mouse, there are a mechanical mouse in which the detection is performed by reading the rotation of a ball, an optical mouse in which the change of an image is detected by an emission center of a light emitting diode and a photoreceiver provided, a laser mouse in which a laser light is used as a light source, etc.

Regarding the click functions and the scroll function, as is described in Japanese Unexamined Patent Application Publication No. 2001-154800, instructions are generally given by the left and right buttons and the central wheel. That is, as shown in FIG. 9, in a personal computer mouse 101, a left button 110 normally performing a click and drag and a right button 120 used for a shortcut menu, etc., are disposed left and right. Then, a wheel 130 to be used in scrolling a screen is disposed in the middle of both buttons.

However, there is a problem in that the conventional personal computer mouse 101 is too large in size. In particular, since the left button 110 and the right button 120 are put side by side and operated by the first finger and the second finger, the width becomes too large. Then, when it is used in a personal computer, it is very much inconvenient to carry that.

Furthermore, regarding the scroll function, since the amount of scrolling is in proportion to the rotation of the wheel 130, when the number of pages is large, there is a problem in that the amount of movement of fingers becomes too much.

Moreover, regarding the right clock function, since it is performed using the second finger, there is a problem in that a great amount of skill is required for the operation. Furthermore, since a large mouse is grabbed and moved while it is pressed downward, there is a problem in that the operator gets easily tired.

SUMMARY OF THE INVENTION

Accordingly, it is an object of the present invention to provide a small-sized personal computer mouse. Then, it is another object of the present invention to provide a personal computer mouse which is easy to carry when the mouse is used in a personal computer. Furthermore, it is another object of the present invention to provide a personal computer mouse in which the scrolling is simple and the amount of movement of fingers is small even if the number of pages is large. Moreover, it is another object of the present invention to provide a personal computer mouse the operation of which does not require skill. Furthermore, it is another object of the present invention to provide a personal computer mouse which is easy to carry and does not make an operator tired.

In order to solve the above-described problems, a personal computer mouse according to an aspect of the present invention is a personal computer mouse having a left click function, a right click function, and a scroll function comprising a horizontally rotating disk-shaped or ring-shaped scroll plate. In the personal computer mouse, the scroll function is performed by rotating the scroll plate. Furthermore, in the present invention, a left click button is provided in the middle of the scroll plate.

Furthermore, in the present invention, the scroll plate is formed so that, when a peripheral portion is pressed down, the scroll plate becomes inclined such that the pressed-down portion has the lowest level, and it is possible to assign a fixed function at a position to be pressed down. Furthermore, in the present invention, a difference-in-level portion is provided on the upper surface of the mouse, the upper surface of the front portion of the mouse is lower than the upper surface of the rear portion, the scroll plate is provided in the front portion, and a right click button is provided at the difference-in-level portion. Furthermore, in the present invention, the scroll plate, the left click button, and the right click button are disposed so as to be operated by means of one finger. Furthermore, in the present invention, a thumb holder on which a thumb can be placed during operation is provided. Furthermore, in the present invention, the front portion can be housed inside the rear portion.

In a personal computer mouse of the present invention, since the above-described means are used, all the operations can be operated by one finger (only the first finger). Accordingly, the personal computer mouse can be made small in size and, when it is used in a personal computer, a personal computer mouse which is easy to carry can be provided. Furthermore, since functions such as a high-speed scroll, etc., can be assigned to a horizontally rotating scroll plate, it is able to provide a personal computer mouse in which the amount of movement of a finger is small. Moreover, since the second finger is not used, it is able to provide a personal computer mouse the operation of which does not require skill. Furthermore, it is able to provide a personal computer mouse, which is easy to carry and does not make an operator tired, by providing a thumb holder therein.

BRIEF DESCRIPTION OF THE DRAWINGS

FIG. 7 is a schematic illustration showing the operation of the personal computer mouse shown in FIG. 5 or FIG. 6;

DESCRIPTION OF THE PREFERRED EMBODIMENTS

Figure 1:
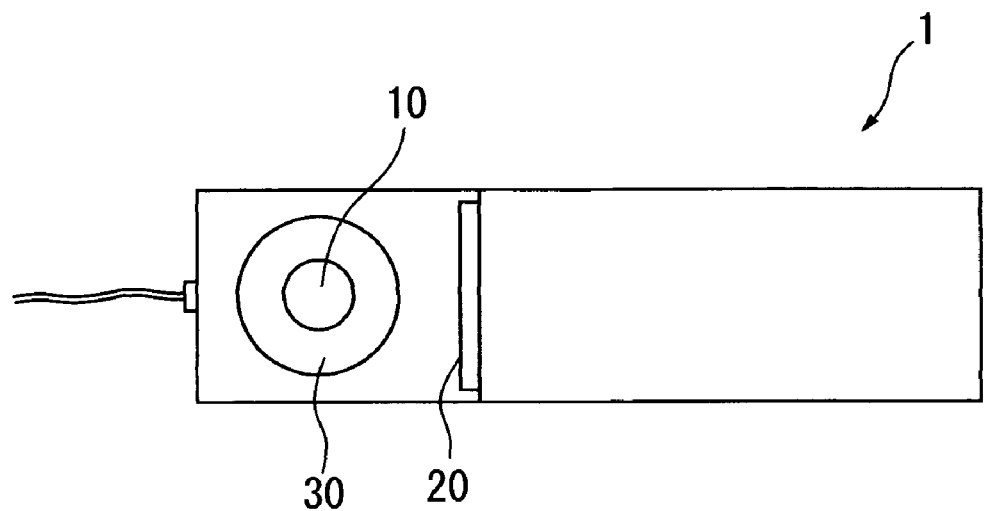
FIG. 1 is a schematic top view showing one example of a personal computer mouse of the present invention.
Figure 2:
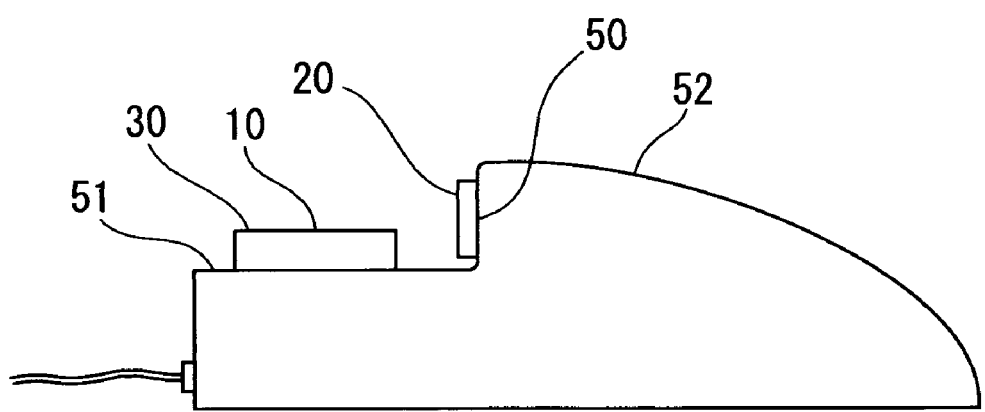
FIG. 2 is a schematic side view of the personal computer mouse shown in FIG. 1.

As one example of embodiments is shown in FIGS. 1 and 2, a personal computer mouse of the present invention is smaller than conventional ones, and is formed so as to be able to perform a left click, a right click function, and a scroll function by an index finger. FIG. 1 is a schematic top view, and FIG. 2 is a schematic side view.

A personal computer mouse 1 of the present invention is characterized in that a disk-shaped or ring-shaped scroll plate 30 which horizontally rotates is provided and that a scroll function is performed by the scroll plate 30. A difference-in-level portion 50 is provided on the upper surface of the personal computer mouse 1, and the upper surface of a front portion 51 is lower in level than the upper surface of a rear portion 52. Then, the scroll plate 30 is provided on the upper surface of the front portion 51. In such a disposition, a user can scroll a screen upward and downward by rotating the scroll plate 30 to the left or to the right while the user holds the upper surface of the rear part 52 of the personal computer mouse 1.

It is desirable to provide a left click button 10 for performing a common click and drag in the center of the scroll plate 30. That is, when the scroll plate 30 is disk-shaped, a button function being operated by the pressure in the central portion is provided and the central portion of the scroll plate 30 is also made to operate as the left click button 10. Furthermore, when the scroll plate 30 is ring-shaped, the left click button 10 is separately provided in the central portion. In this way, the disposition in which top priority is given to the most frequently used left click button 10 can be realized.

It is desirable that, when the peripheral portion is pressed down, the scroll plate 30 is inclined such that the pressure portion becomes the lowest level. When such a form is used, it becomes possible to assign a fixed function at a position to be pressed. For example, it becomes possible to add a high-speed scroll function, a from-side-to-side scroll function, etc., different from the ordinary scroll. When a high-speed scroll function is made available, the amount of movement of fingers is greatly reduced.

Figure 3:
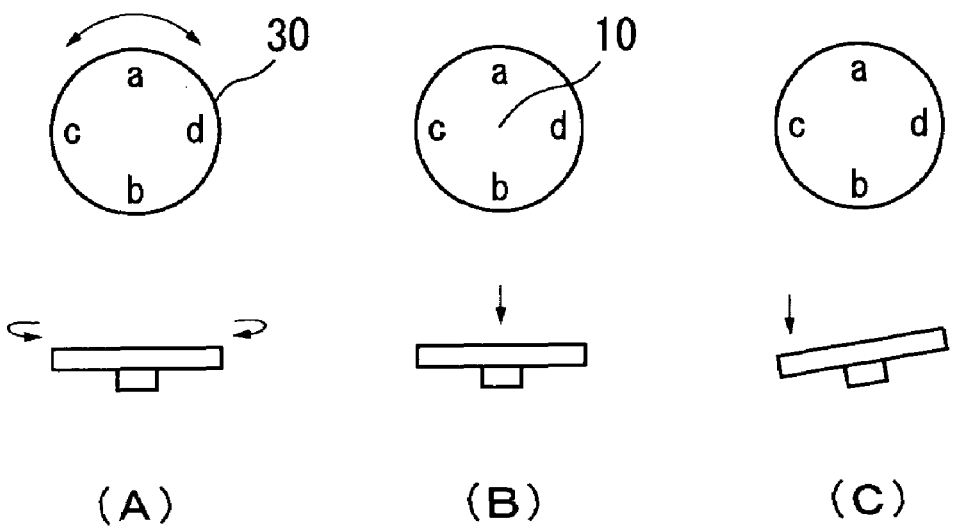
FIGS. 3A to 3C are illustrations of a disk-shaped scroll plate.

The case in which the scroll plate 30 is a disk-shaped one is shown in FIGS. 3A to 3C. It is able to scroll a screen by rotating the scroll plate 30 in the direction of arrows shown in FIG. 3A. For example, the screen is scrolled upward by right rotation and the screen is scrolled downward by left rotation. Furthermore, as shown in FIG. 3B, a function in which the left clock button 10 goes down by pressing the central portion is given. Moreover, as shown in FIG. 3C, the scroll plate 30 is inclined by pressing down a to d in the peripheral portion, and various functions are given in such a away that a high-speed scroll up is performed by pressing down a, a high-speed scroll down is performed by pressing down b, a left scroll is performed by pressing down c, and a right scroll is performed by pressing down d.

Figure 4:
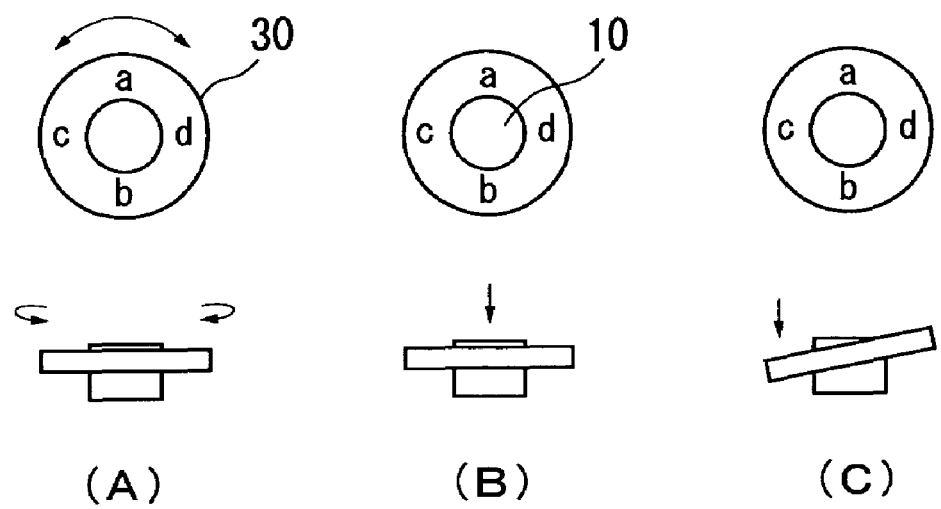
FIGS. 4A to 4C are illustrations of a ring-shaped scroll plate.

The case in which the scroll plate 30 is a ring-shaped one is shown in FIGS. 4A to 4C. It is able to scroll a screen by rotating the scroll plate 30 in the direction of arrows in FIG. 4A. For example, the screen is scrolled upward by right rotation and the screen is scrolled downward by left rotation. Furthermore, as shown in FIG. 4B, the left click button 10 is provided in the central portion of the scroll plate 30. Moreover, as shown in FIG. 4C, the scroll plate 30 is inclined by pressing down a to d in the peripheral portion, and various functions are given in such a away that a high-speed scroll up is performed by pressing down a, a high-speed scroll down is performed by pressing down b, a left scroll is performed by pressing down c, and a right scroll is performed by pressing down d.

It is desirable to provide a right click button 20 used for a shortcut menu, etc., in a difference-in-level portion 50. When the right click button 20 is disposed in the difference-in-level portion 50, it can be operated by an index finger. Accordingly, the left click function, the right click function, and the scroll function can be operated by only one of an index finger. Furthermore, since the second finger is not used in the operation, practice is not necessary for the operation.

Figure 5:
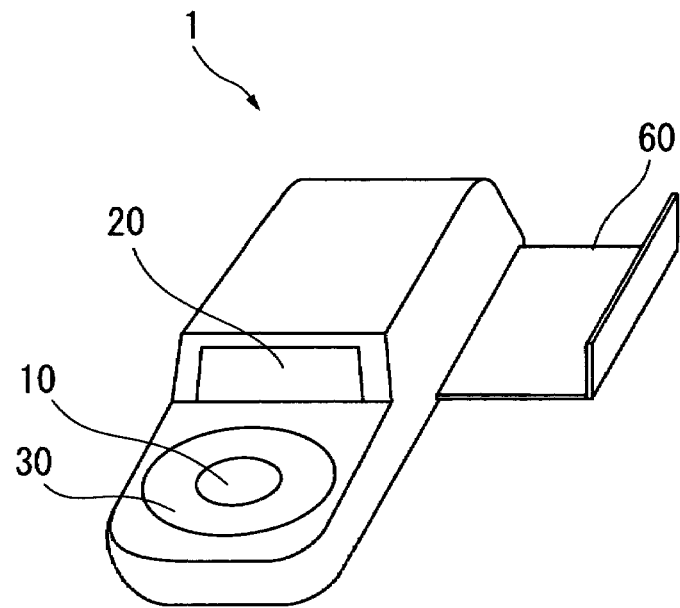
FIG. 5 is a schematic perspective view showing one example of a personal computer mouse, having a thumb holder of a drawer type, of the present invention.
Figure 6:
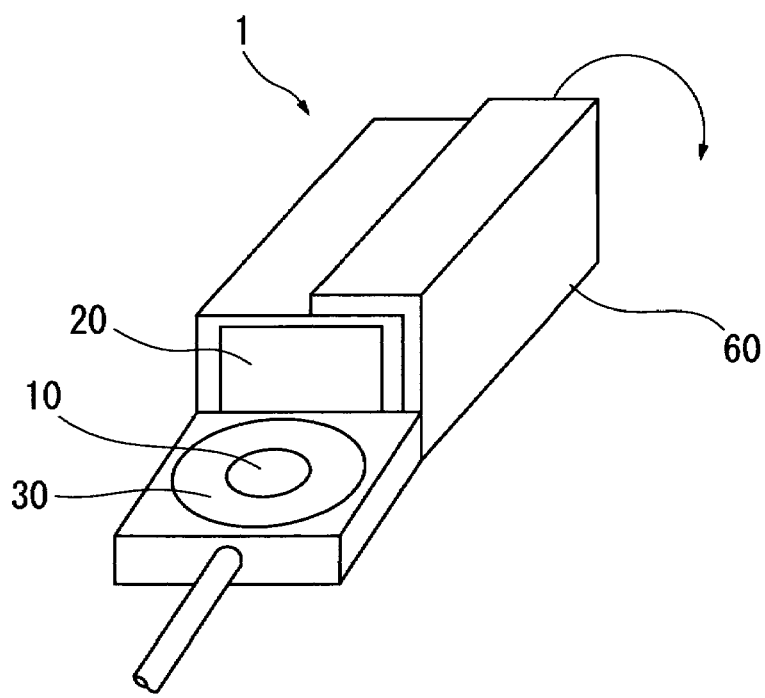
FIG. 6 is a schematic perspective view showing one example of a personal computer mouse, having a thumb holder of a rotation type, of the present invention.

As shown in FIG. 5 or FIG. 6, in the personal computer mouse 1 of the present invention, it is desirable that a thumb holder 60 is provided. That is, as shown in FIG. 7, when an operation is performed while a thumb is placed in the thumb holder 60, since the operation can be performed without using strength, it becomes easy to move the personal computer mouse 1 and the operation can be performed without getting tired.

It is desirable that the thumb holder 60 can be compactly housed inside the mouse main body when it is not used. That is, what is shown in FIG. 5 can be compactly housed when it is not used, and the thumb holder 60 can be used by taking out it at use. Furthermore, what is shown in FIG. 6 is housed so as to cover the upper surface of the mouse when it is not used, and the thumb holder 60 can be used by turning it over.

Figure 8:
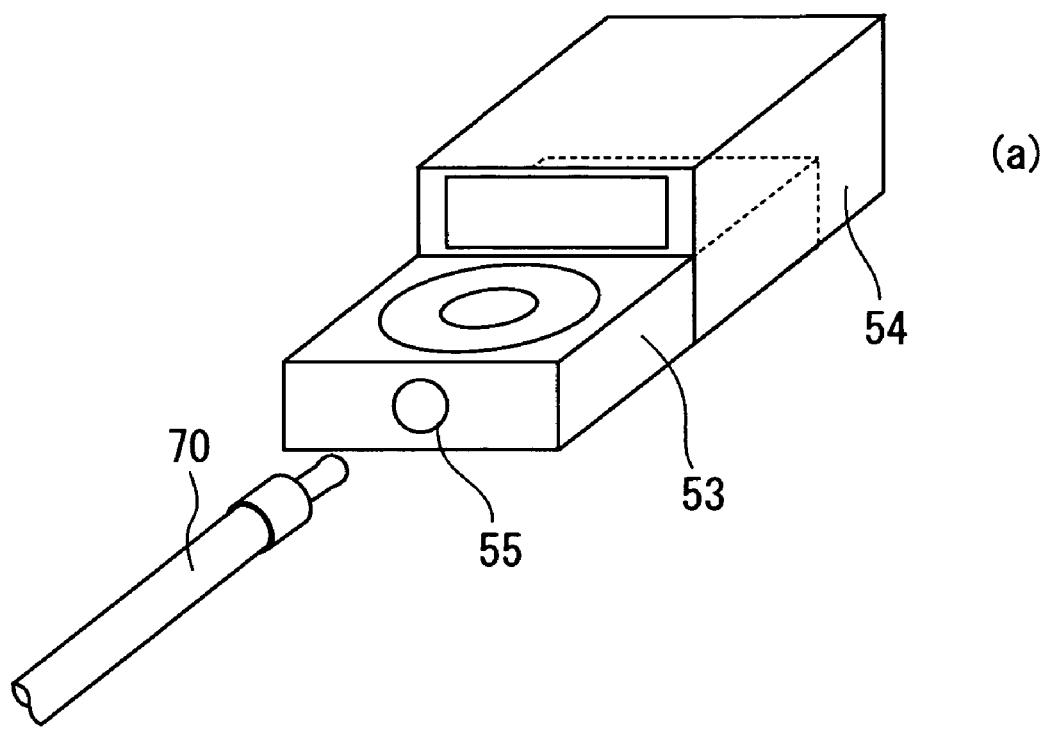
FIGS. 8A and 8B are schematic perspective views showing one example of a personal computer mouse, in which the front portion can be housed inside the rear portion, of the present invention.
Figure 8:
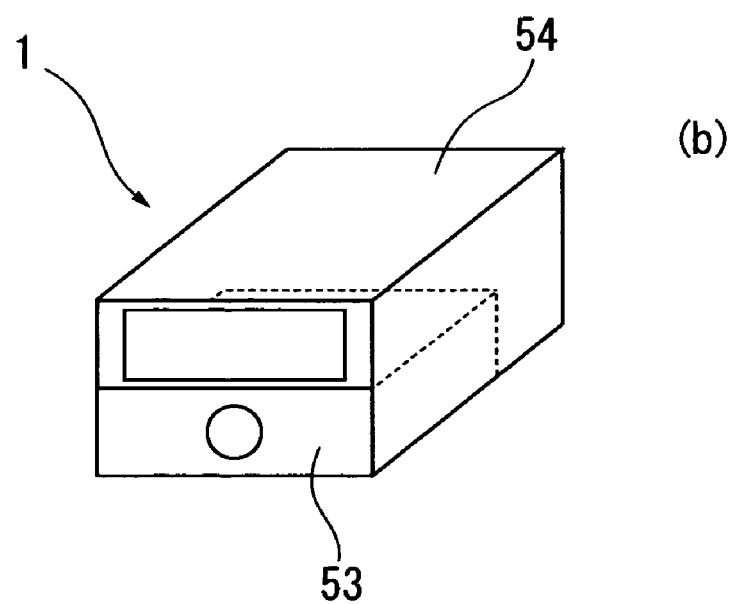
Figure 9:
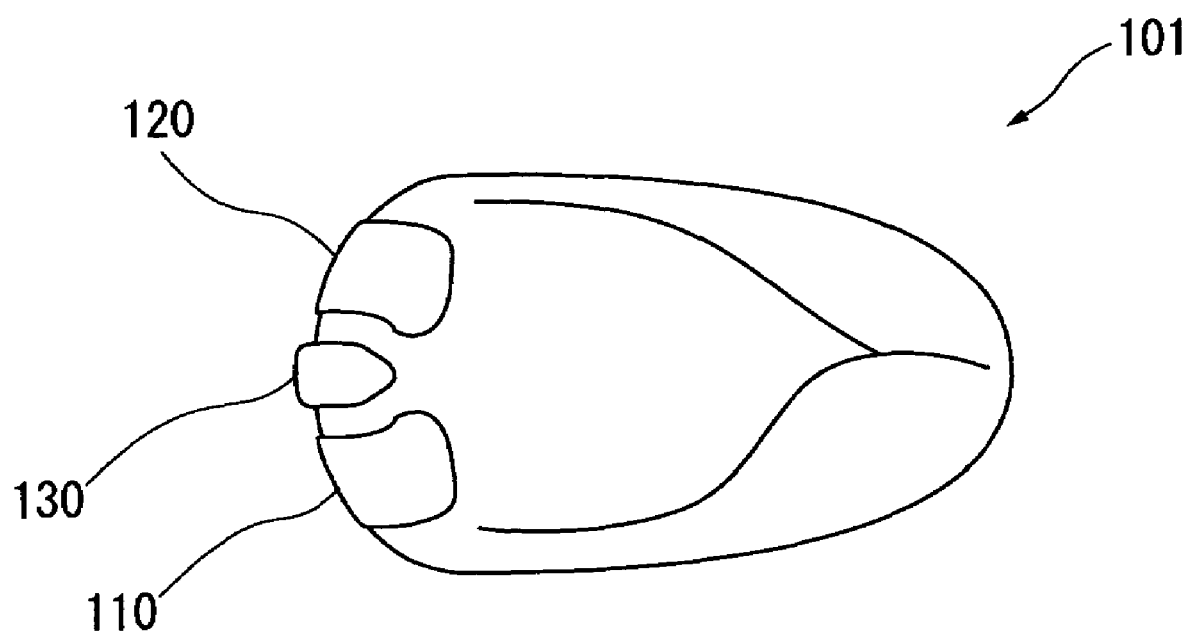
FIG. 9 is a schematic top view showing a conventional personal computer mouse.

Furthermore, as shown in FIGS. 8A and 8B, it is desirable that, in the personal computer mouse 1 of the present invention, a front portion 53 can be housed inside a rear portion 54. Moreover, it is desirable that, as shown in FIG. 8A, normally a cord 70 connected to the front portion 53 is attachable to and detachable from an outlet 55. That is, as shown in FIG. 8B, the personal computer mouse 1 can be more compact in such a way that the front portion 53 is housed inside the rear portion 54 and the cord 70 is detached. Moreover, among methods for housing the front portion 53 in the rear portion 54, in addition to the sliding type shown in FIGS. 8A and 8B, there can be a folding type.

A personal computer mouse of the present invention is characterized by the left click function, the right click function, the scroll function, their shapes, etc., and, regarding the other component parts, a conventional technology can be used. For example, regarding the pointer function, a conventional mechanical mouse, optical mouse, laser mouse, etc., can be used. Furthermore, regarding the connection to a personal computer, in addition to the use of a cable, a wireless mouse using infrared radiation can be also used.

Since a personal computer mouse of the present invention can be made compact, when used for a personal computer, it becomes easy to carry the personal computer mouse. For example, a personal computer mouse can be carried in such a way that an insertion portion is formed in the main body of a personal computer and the personal computer mouse is inserted in the insertion portion.

What is claimed is:

1. A personal computer mouse having a left click function, a right click function, and a scroll function comprising:
   a horizontally rotating ring-shaped scroll plate,
   wherein the scroll function is performed by rotation of the scroll plate, and a left click function button is provided in a middle portion of the scroll plate,
   wherein a difference-in-level portion is provided on an upper surface of the mouse between a front portion and a rear portion of the mouse, an upper surface of the front portion is lower than an upper surface of the rear portion, the scroll plate is disposed in the front portion, and a right click function button is provided at the difference-in-level portion, and wherein the scroll plate, the left click function button, and the right click function button are disposed so as to be operated by a same finger.

2. The personal computer mouse as claimed in claim 1, wherein the scroll plate is formed so that, when a peripheral portion of the scroll plate is pressed down, the scroll plate becomes inclined such that the pressed-down portion has the lowest level, and a fixed function is assigned to a position on the peripheral portion to be pressed down.

3. The personal computer mouse as claimed in claim 1, further comprising a thumb holder on which a thumb can be placed during operation.

4. The personal computer mouse as claimed in claim 1, wherein the front portion can be housed inside the rear portion.

5. The personal computer mouse as claimed in claim 1, wherein the difference-in-level portion includes a first surface which extends substantially perpendicularly to the upper surface of the front portion.

* * * * *